US006767462B2

(12) United States Patent
Park

(10) Patent No.: US 6,767,462 B2
(45) Date of Patent: Jul. 27, 2004

(54) APPARATUS AND METHOD FOR PURIFYING WASTEWATER USING BACK OVERFLOWED SLUDGE

(76) Inventor: Suk Gyun Park, 133-27, Mia 9-dong, Gangbuk-gu, Seoul (KR), 142-190

( * ) Notice: Subject to any disclaimer, the term of this patent is extended or adjusted under 35 U.S.C. 154(b) by 50 days.

(21) Appl. No.: 10/318,575

(22) Filed: Dec. 12, 2002

(65) Prior Publication Data

US 2003/0136732 A1 Jul. 24, 2003

(30) Foreign Application Priority Data

Dec. 26, 2001 (KR) .............................. P10-2001-0085223

(51) Int. Cl.[7] .................................................. C02F 3/30
(52) U.S. Cl. .................... 210/605; 210/623; 210/195.3; 210/260
(58) Field of Search ................................. 210/605, 621, 210/623, 631, 195.1, 195.3, 197, 259, 260

(56) References Cited

U.S. PATENT DOCUMENTS

| | | | | | |
|---|---|---|---|---|---|
| 2,620,926 | A | * | 12/1952 | Helbig | 210/661 |
| 3,415,378 | A | * | 12/1968 | Fukuda | 210/220 |
| 3,883,427 | A | * | 5/1975 | Oldham et al. | 210/776 |
| 4,353,800 | A | * | 10/1982 | Besik | 210/605 |
| 4,608,157 | A | * | 8/1986 | Graves | 210/86 |
| 5,578,202 | A | * | 11/1996 | Hirane | 210/150 |
| 5,792,355 | A | * | 8/1998 | Desjardins | 210/605 |
| 5,942,108 | A | * | 8/1999 | Yang | 210/195.3 |
| 2002/0113010 | A1 | * | 8/2002 | Ricketts | 210/615 |

FOREIGN PATENT DOCUMENTS

JP 10249391 * 9/1998

OTHER PUBLICATIONS

CASS Process Description, 02–11–18, Brief History of Sequencing Batch Reactors, http://www.sbrcass.com/process.htm, pp. 1–4, CASS Water Engineering, Inc., 2000.
ITT Industries, ICEAS Process System, Sequential Batch Reactor, SBR System, sludge d . . . , http://www.sanitaire.com/abj/process.asp, 02–11–18, pp.1–2, 2000.
United Industries, Inc., S.S. Deltona Clarifier, http://www.ui-inc.com/boat.htm, 02–01–09, pp. 1–3, date not provided.
U.S. Environmental Protection Agency (EPA), Manual Nitrogen Control, EPA/625/R–93/010, Sep. 1993, pp. 1–7.

* cited by examiner

Primary Examiner—Fred G. Prince
(74) Attorney, Agent, or Firm—Anderson Kill & Olick, PC

(57) ABSTRACT

A wastewater purifying apparatus using a back overflowed sludge includes a water tank having an inflow port for accepting wastewater and an outlet for discharging purified water, and a first barrier for dividing the water tank into a steady-flow region and a turbulent-flow region according to flow type, the first barrier submerged in the wastewater when it is filled in the water tank to a predetermined water level to allow sludge in the turbulent-flow region to flow backward the steady-flow region without extra device of settling and return.

22 Claims, 16 Drawing Sheets

APPARATUS AND METHOD FOR PURIFYING WASTEWATER USING BACK OVERFLOWED SLUDGE

BACKGROUND OF THE INVENTION

1. Field of the Invention

The present invention relates to an apparatus and a method for purifying wastewater, and more particularly, to an apparatus and a method for purifying wastewater using a back overflowed sludge, which is constructed in a manner that a barrier is set in an SBR water tank to divide the water tank into a turbulent-flow region and a steady-flow region, and sludge passes over the barrier to overflow from the turbulent-flow region to the steady-flow region, to thereby effectively removing nitrogen and phosphorus contained in wastewater inflowing into the water tank, and reducing the energy and cost of treatment. Moreover, if barriers are inserted in forepart of typical SBR, it can be obtained some effect of the present invention. Consequently, the present invention's principle that sludge in turbulent flow region is flowed backward into steady-flow region by mixer and aerator in reactor can be easily applied to various wastewater treatment reactors.

2. Background of the Related Art

When microorganisms grow rapidly, generally, nitrogen and phosphorus are essential nutriments for activating and propagating microorganisms. In a case where the nutriments such as nitrogen and phosphorus are excessively contained in waste water, however, self-nutritive substances including the hydrophytes propagate rapidly and bring about eutrophication that further make worse the quality of sewage and/or wastewater. Accordingly, biological wastewater treatment process including A2O process, a modified phostrip method, UCT method, VIP method, DNR process, and SBR process were proposed in order to effectively eliminate the nitrogen and phosphorus excessively contained in wastewater.

In general, nitrogen exists in wastewater in the form of organic nitrogen and ammonia nitrogen. The organic nitrogen and ammonia nitrogen are removed from waste water through nitrification by which the organic nitrogen and ammonia nitrogen are biologically oxidized in an aerobic condition to be changed into $NO_2$ and $NO_3$ and denitrification by which $NO_2$ and $NO_3$ reduced to nitrogen gas in an anoxic state. The biological nitrogen and phosphorus removal is explained below in more detail.

Nitrification:

The nitrification includes a process (1) in which microorganisms hydrolyze organic nitrogen to change it into $NH^+_4$-N and this $NH^+_4$-N is oxidized to $NO^-_2$ by nitrosomonas, and a process (2) in which the $NO_2$ is oxidized to $NO^-_3$ by nitrobactor. The nitrification is represented by the following chemical reaction formulas (1) and (2).

$$NH_4^{+N}+1.5O_2 \rightarrow NO_2^-+H_2O+2H^+ \text{ (Nitrosomonas)} \quad (1)$$

$$NO_2^-N+1.5O_2 \rightarrow NO_3^- \text{ (Nitrobactor)} \quad (2)$$

Accordingly, the entire chemical reaction formula of the nitrification can be represented by the following formula (3).

$$NH_4^+N+2O_2 \rightarrow NO_3^-+H_2O+2H^+ \quad (3)$$

Therefore, the ammonia contained in wastewater is eliminated therefrom through the aforementioned nitrification.

Denitrification:

The dentrification is the dissimilatory reduction of $NO_3$ or $NO_2$ to $N_2$ gas. In other words, $NO^-_3$ or $NO_2$ is the electron accepter used in energy generation. The denitrification is represented by the following chemical reaction formula (two-step process) (4). The first step is conversion of nitrite. This stage is followed by production of nitric oxide, nitrous oxide and nitrogen gas. The last three compounds are gaseous product that can be released to the atmosphere.

$$NO_3^- \rightarrow NO_2^- \rightarrow NO \rightarrow N_2 \quad (4)$$

Phosphorous removal:

Under certain aerobic condition, more phosphorous may be taken by microorganism in phosphate state. The phosphorus being in the phosphate state is released from the microorganisms under the anaerobic state. When the microorganisms take up more phosphorous under aerobic condition than is needed, they go to the bottom of a water tank because the large amount of phosphate is stored in their cells. Here, the microorganisms that sank down in the water tank become sludge. Accordingly, when the sludge containing the excess phosphorous, accumulated on the bottom of the water tank is eliminated; the phosphorus contained in wastewater is removed therfrom. Under the anaerobic conditon, certain heterophobic bacterics take up simple organic molecular produced by hydrolysis and fermentation. Because no electron acceptor are available, they sequester the electrons and carbon in insoluble intracellular solid, such as (ploy-hydroxy butyric acid). To do this phospherization, the cell requires an activated chemical form, that is, acetyl concenzyme a (HSCoA). Formation of HSCoA is energy consume step, and energy come from hydrolyzing of Ploy-P, which these microorganism also contain and use as an energy-store material. The hydrolysis of Poly-P in microorganism releases phosphate to environment under anaerobic condition.

Accordingly, the phosphorus contained in wastewater can be easily eliminated therefrom by allowing the microorganisms to excessively take the phosphorus during anaerobic condition. To make the microorganisms take excessive amount of phosphorus, it is required to allow the microorganisms to release lots of phosphate, first of all.

When an electron acceptor $NO_3$, for example, exists in the reactor, during process for phosphate release the microorganisms do not release phosphorus effectively. In this case, the environment of reactor is changed from aerobic condition to anaerobic condition so as to eliminate the phosphorus.

To remove organisms, nitrogen and phosphorus contained in wastewater, a conventional purifying apparatus like $A_2O$ process includes multi-stage anaerobic, anoxic and aerobic reaction tanks and a settling basin. However, the conventional purifying apparatus ($A_2O$) has problems that its installation cost is high and installation region is large.

To solve the above stated problems, SBR process was developed to operate organic compound, N and P removal process, settling and drawing process in one reactor. However, SBR cannot effectively eliminate the nitrogen and phosphorous because it uses one reactor due to biological mechanism. Therefore, improved SBR in which sludge is returned to the front of SBR reactor like $A_2O$ process are being developed and applied to overcome disadvantage of conventional SBR. But, its structure and device is complex and it is difficult to operate process as compared with conventional SBR because improved SBR require pump and pipe for sludge return. Furthermore, it takes a large amount of cost to maintain and manage the apparatus.

SUMMARY OF THE INVENTION

Accordingly, the present invention is directed to an apparatus and method for purifying wastewater that substantially obviates one or more problems due to limitations and disadvantages of the related art.

An object of the present invention is to provide an apparatus and method for purifying wastewater using back overflowed sludge, in which sludge flows backward over barriers set inside a water tank to purify wastewater contained in the water tank.

Another object of the present invention is to provide an apparatus and method for purifying wastewater using back overflowed sludge, in which sludge flows backward over barriers set inside a water tank according to a turbulent flow formed when wastewater and sludge contained in the water tank are mixed by aeroactor or mixer, thereby purifying the wastewater.

Yet another object of the present invention is to provide an apparatus and method for purifying wastewater using back overflowed sludge, in which a barrier is set inside an water tank to divide the water tank into a turbulent-flow region and a steady-flow region according to flow type, and sludge flows backward over the barrier from the turbuient-flow region to the steady-flow region to maintain high MLSS in steady-flow region, thereby further improving condition for nitrogen and phosphorous removal.

To accomplish the objects of the present invention, there is provided a wastewater purifying apparatus using back overflowed sludge, comprising a water tank having an inflow port for accepting wastewater and an outlet port for discharging purified water, and a first barrier for dividing the water tank into a steady-flow region and a turbulent-flow region according to flow type, the first barrier submerged in the wastewater when it is filled in the water tank to a predetermined water level to allow sludge in the turbulent-flow region to flow backward into the steady-flow region.

To accomplish the objects of the invention, there is also provided a wastewater purifying apparatus using back overflowed sludge, comprising a water tank having an inflow port for accepting wastewater and a outlet for discharging purified wastewater; a first barrier for dividing the water tank into a working reaction tank and a main reaction tank according to nitrogen and phosphorous removal mechanism, the working reaction tank including a steady-flow region accepting the wastewater through the inflow port, the main reaction tank forming a turbulent-flow region and drawing purified water through the outlet, the first barrier submerged in the wastewater filled in the water tank; and a second barrier for dividing the working reaction tank into an anaerobic region and a buffering region (anaerobic/anoxic region), the anaerobic region accepting the influent, the buffering region (anaerobic/anoxic region) accepting sludge back flowed over the first barrier from the main reaction tank.

To accomplish the objects of the invention, there is provided a wastewater purifying method using back overflowed sludge, comprising a microorganism selection process of adsorbing organisms by maintaining a high F/M ratio using organisms contained in influent; an anaerobic process of forming an anaerobic condition to release phosphorus; a sludge transferring process of allowing sludge in anaerobic region to flow under second barrier from an anaerobic region into a main reaction tank via an anaerobic/anoxic region with influent waste water; an aerobic process of oxidizing organic nitrogen and $NH^+_4$ to $NO^-_2$ and $NO^-_3$ using an aerator of the main reaction tank, excessively taking in phosphorous into the cell, and generating turbulent flow by rising bubble; an anoxic process of denitrifying the nitrate generated during the aerobic process to remove the nitrogen; a sludge returning process of allowing sludge raised by turbulent flow to flow backward during the aerobic and anoxic process and a mixing process of mix uniformly sludge and influent in water tank and generating turbulent flow; a first settling process of settling the sludge in the anaerobic/anoxic region; a concentration process of concentrating the settled sludge by force of gravity; a returning/transferring process of transferring the concentrated sludge in buffering region into the anaerobic region; a second settling process of settling the mixed sludge in the main reaction tank; and a drawing process of decanting the cleared wastewater without disturbing the settled sludge.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiment (s) of the invention, together with the description, to explain the principle of the invention. In the drawings.

DETAILED DESCRIPTION OF THE INVENTION

Figure 1A:
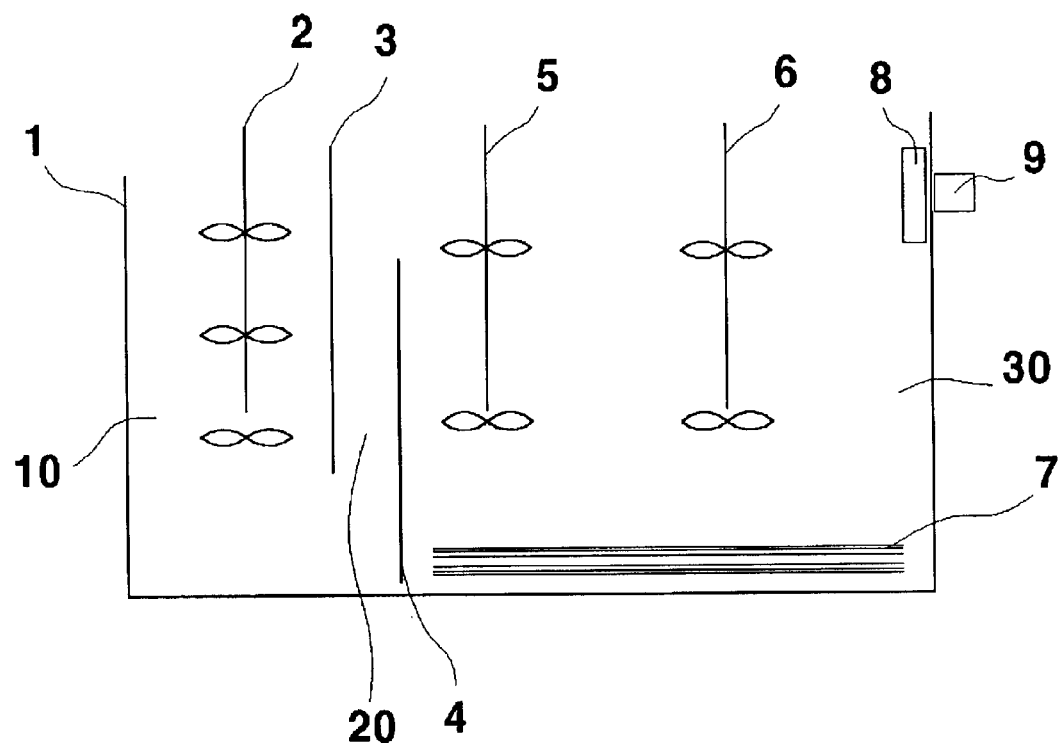
FIG. 1A is a cross-sectional view of a wastewater purifying apparatus using back overflowed sludge according to a first embodiment of the present invention.

Reference will now be made in detail to the preferred embodiments of the present invention, examples of which are illustrated in the accompanying drawings. FIG. 1A is a cross-sectional view of a wastewater purifying apparatus using back overflowed sludge according to a first embodiment of the present invention, and FIG. 1B is a plan view of FIG. 1A.

Figure 1B:
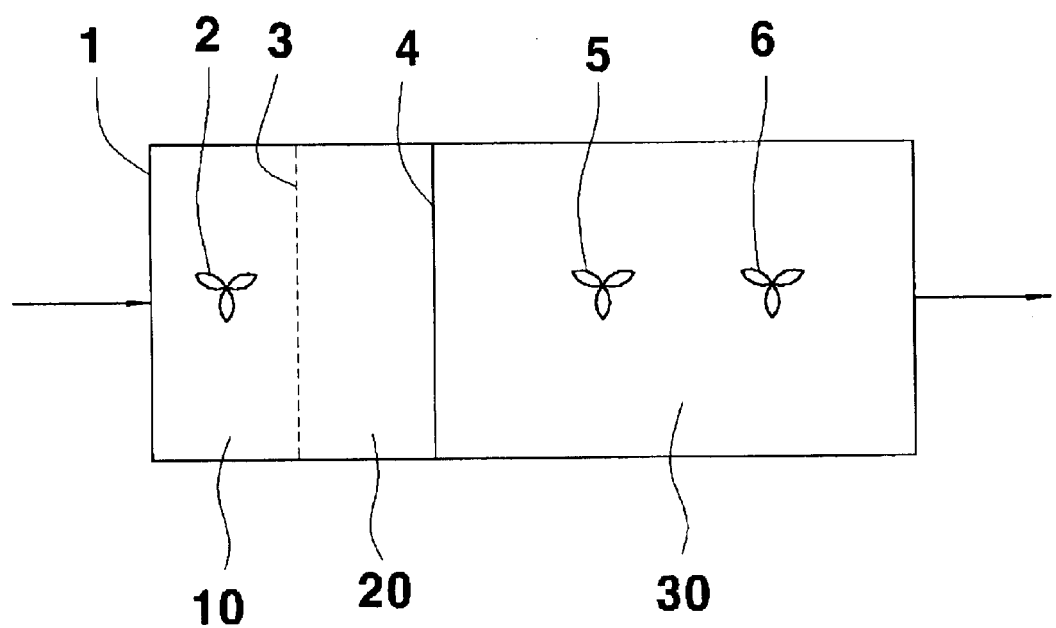
FIG. 1B is a plan view of FIG. 1A.

As shown in FIGS. 1A and 1B, the purifying apparatus using back overflowed sludge according to the first embodiment of the invention includes a single water tank 1, barrier 4 that divides the water tank 1 into a working reaction tank and a main reaction tank according to nitrogen and phosphorous removal mechanism, and barrier 3 that divides working reactor into an anaerobic region 10 for accepting and treating wastewater and an anaerobic/anoxic region 20 for treating the wastewater incoming from the anaerobic region 10. Sludge in an anaerobic region and anaerobic/anoxic region was returned from the main reaction tank during aerobic and anoxic condition of main reaction tank. In addition, the purifying apparatus further includes stirrers 2, 5 and 6 placed in the reaction tanks, an aerator 7 set inside the main reaction tank 30, an inflow port (not shown) set at the anaerobic region of the working reaction tank, through which wastewater flows into the working reaction tank, a decanter 8 for drawing purified water from the main reaction tank 30, and an outlet 9 through which the purified water is drawn.

The anaerobic region 10 is a reaction tank for accepting sludge from the anaerobic/anoxic region 20 to maintain sludge concentration (content) uniform. In this reaction tank, sludge release phosphorous by using organic compound in influent.

The anaerobic/anoxic region 20 is a reaction tank for receiving wastewater and sludge from the anaerobic region 10 or main reaction tank, settling, concentrating sludge that returned from main reactor tank, and transferring concentrated sludge into anaerobic region. In this reaction tank, sludge back flowed over the barrier 4 from the main reaction tank 30 is concentrated and nitrate transferred with sludge is denitrified during aerobic process of main reactor and phosphorous was released during settling or decanting process of it.

The main reaction tank 30 performs an aerobic process and an anoxic process to eliminate nitrogen and phosphorus from wastewater when aerator and mixer occurred turbulent flow. Sludge was returned over the barrier 4 from the main reaction tank 30 into the anaerobic/anoxic region 20 and remaining sludge is settled in the main reaction tank 30 during settling process. In addition, the main reaction tank draw purified wastewater through outlet.

The operation of the purifying apparatus using back overflowed sludge according to the first embodiment of the invention is explained below with reference to FIGS. 2A to 2E.

Figure 2A:
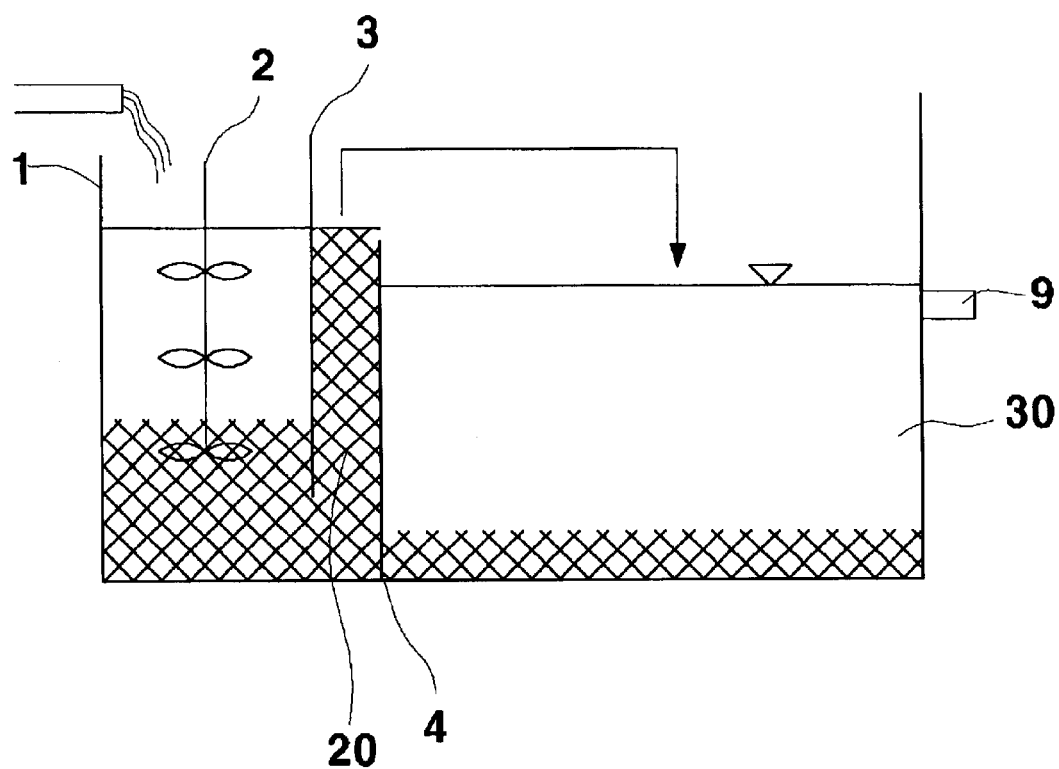
FIGS. 2A to 2E illustrate a purifying method in the purifying apparatus using back overflowed sludge according to the first embodiment of the present invention.

When influent flows into the anaerobic region 10 in the water tank 1 through the inflow port, the influent fills the anaerobic region 10 and the anaerobic/anoxic region 20, and then flows over the barrier 4 into the main reaction tank 30. In the anaerobic region 10, microorganisms take organic compound contained in the influent water to release phosphorus. Simultaneously, when the stirrer 2 operates, the influent water and sludge in the anaerobic region 10 flow over the barrier 4 into the main reaction tank 30 via the anaerobic/anoxic region 20, as shown in FIG. 2A.

Figure 2B:
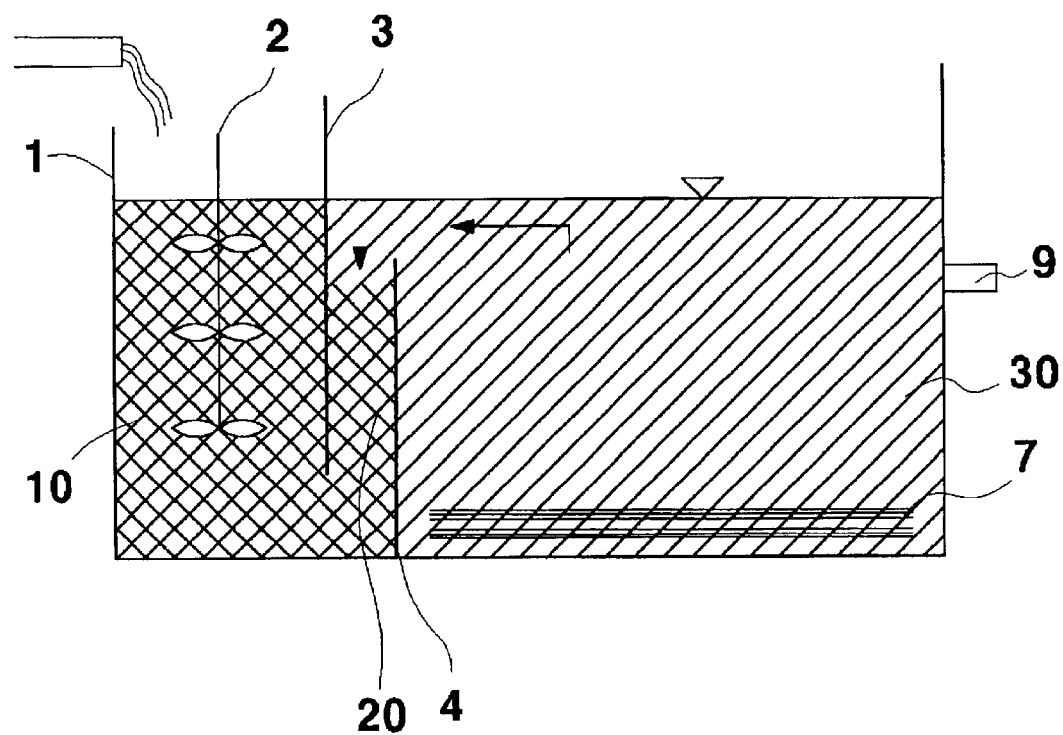

In the aerobic condition formed by the aerator, as shown in FIG. 2B, the microorganisms in the main reaction tank excessively take phosphorus that was released in anaerobic region and anaerobic/anoxic region and simultaneously oxidize organic nitrogen and ammonia contained in influent to $NO_2$ and $NO_3$.

Simultaneously, the influent water and sludge continuously flow into the main reaction tank 30 until the barrier 4 is submerged and water tank is filled to the provided level in it. In several minutes after start of influent, the aerator 7 operates to form bubbles and a turbulent flow in the main reaction tank, whereby the sludge is uniformly distributed in the main reaction tank 30. Then, the sludge in the main reaction tank 30 flows backward over the barrier 4 into the anaerobic/anoxic region 20 in a steady-flow state. The sludge back flowed into the anaerobic/anoxic region 20 from the main reaction tank 30 is settled and concentrated by force of gravity. Here, the barrier 4 is lower than the wall of the water tank, which submerged in water and is below high water level of the main reactor tank to allow the sludge to return into the anaerobic/anoxic region 20. Here, "flow backward" means that sludge flow toward inflow port from the main reaction tank having outlet port, and "flow" means that influent and sludge flow in the opposite direction of "flow backward."

Figure 2C:
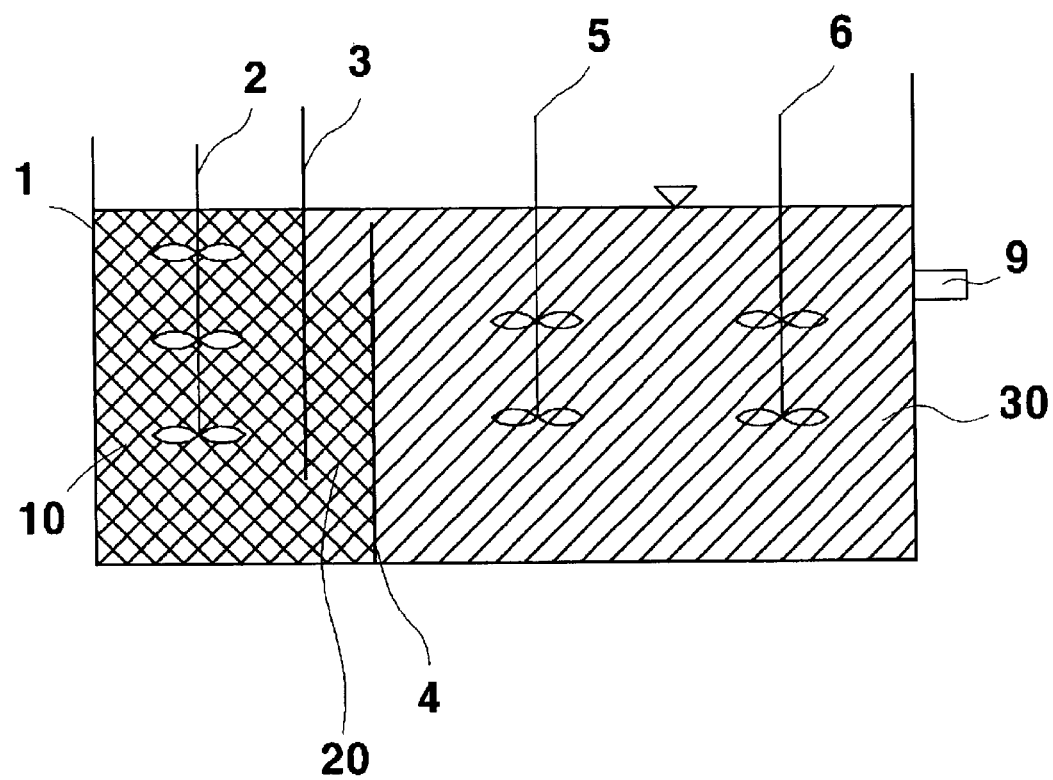
Figure 2D:
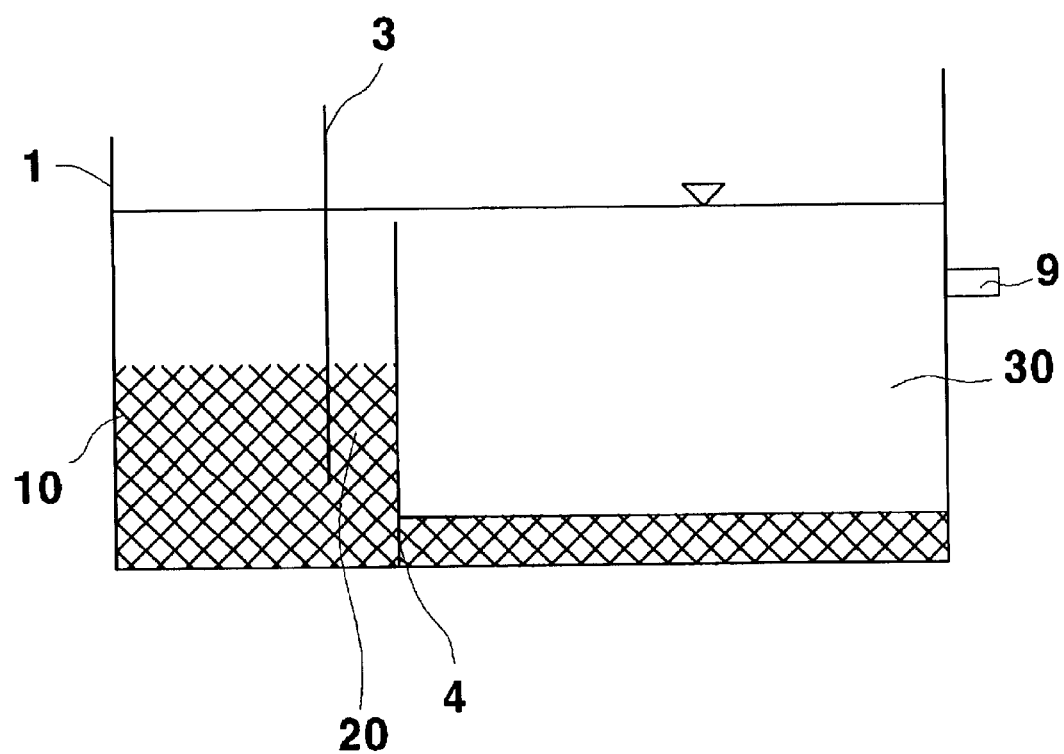

When the aerator and stirrer allows the sludge to flow backward to the anaerobic/anoxic region from the main reaction tank for a predetermined period of time and then stops this activity, the main reaction tank becomes the anoxic condition. Then, as shown in FIG. 2C, the stirrers 5 and 6 uniformly mix the sludge and wastewater to make denitrification occur efficiently in the anoxic condition. While the sludge is uniformly mixed by the stirrers in the main reaction tank, a portion of sludge suspended in the main reaction tank flow backward over the barrier 4 into the anaerobic/anoxic region 20. After this activity, the stirrers 5 and 6 in the main reaction tank 30 and the stirrer 2 in the anaerobic region 10 stop their operations for a predetermined period of time. Then, all reaction tank operate settling process, as shown in FIG. 2D.

Figure 2E:
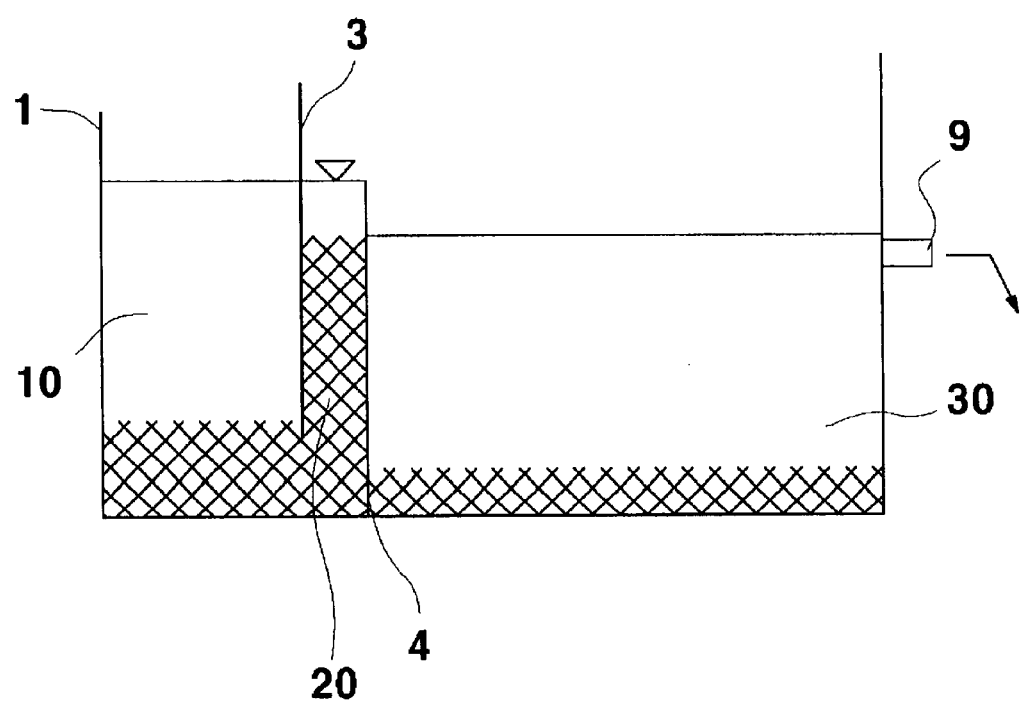

Subsequently, as shown in FIG. 2E, the main reaction tank 30 draw purified water through the outlet 9 to the outside. A portion of the sludge settled in the working reaction tank is discharged through a pipe (not shown) set at the bottom of the working reaction tank such that phosphorus is efficiently removed and a water level and MLSS concentration of the main reaction tank are appropriately maintained.

Accordingly, the purifying apparatus according to the first embodiment of the present invention repeatedly performs the aforementioned process in which the sludge is inflowed to the main reaction tank and returned from the main reaction tank, to thereby purify the wastewater and discharge purified water. Specifically, the first embodiment of the present invention sets the barriers 3 and 4 inside the tank 1 to form the anaerobic region, buffering region and main reaction region, and maintains adaptive anaerobic state conditions for activities of microorganisms in the anaerobic region to allow the microorganisms to easily release phosphorus contained in their cells. In addition, anaerobic/anoxic region play an important that exclude nitrate in flowed from the main reactor tank from anaerobic/anoxic region to make anaerobic condition of anaerobic region, therefore, phosphorous is well released in anaerobic region, And the sludge suspended by turbulent produced by bubble and mixing during aerotion process of the main reation tank is moved and settled in the aneaerobic/anoxic region to be steady flow state or remain in the main reaction tank, a portion of settled in anaerobic/anoxic region is transferred to anaerobic region and the remainder is concentrated in anaerobic/anoxic region. Because MLSS concentration of the main reaction tank is high in spit of "flowing backward sludge", nitrogen and phosphorus can be removed efficiently.

Meantime, the stirrer 2 set in the anaerobic region 10 increases the quantity of sludge transferred from the main reaction tank 30 to the anaerobic/anoxic region 20 and, simultaneously, raises the quantity of sludge transferred from the anaerobic/anoxic region 20 to the anaerobic region 10. A modified embodiment of the purifying apparatus that has no barrier 3 can performs the same operation as that of the first embodiment of the invention.

Figure 3:
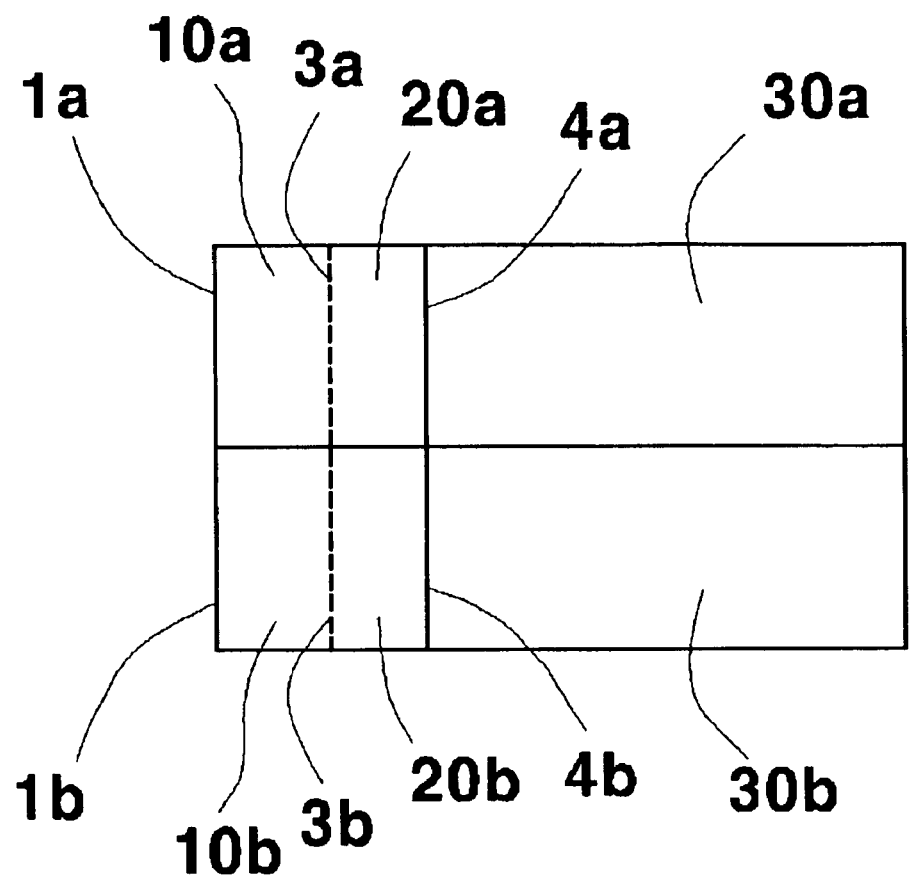
FIG. 3 is a plan view of a wastewater purifying apparatus using back overflowed sludge according to a second embodiment of the present invention.

FIG. 3 is a plan view of a purifying apparatus using the back overflowed sludge according to the second embodiment of the invention. The purifying apparatus according to the second embodiment of the invention includes two parallel water tanks being identical with the water tank of the first embodiment of the apparatus. Specifically, the purifying apparatus according to the second embodiment includes first water tank 1a accepting waste water through an inflow port and purifying it, and a second water tank 1b that purifies waste water contained therein without receiving additional waste water and discharges the purified water while the first water tank 1a is accepting and purifying waste water.

In the second embodiment of the invention, the first and second water tanks alternately perform their operations to continuously purify influent wastewater. Specifically, while the anaerobic region 10a, anaerobic/anoxic region 20a and main reaction tank 30a of the first water tank 1a accept wastewater to purify it the second water tank 1b performs the purifying, settling and drawing process. On the contrary, while the first water tank 1a performs the purifying, settling and drawing process the second water tank 1b accept wastewater to carry out the purifying process.

Figure 4A:
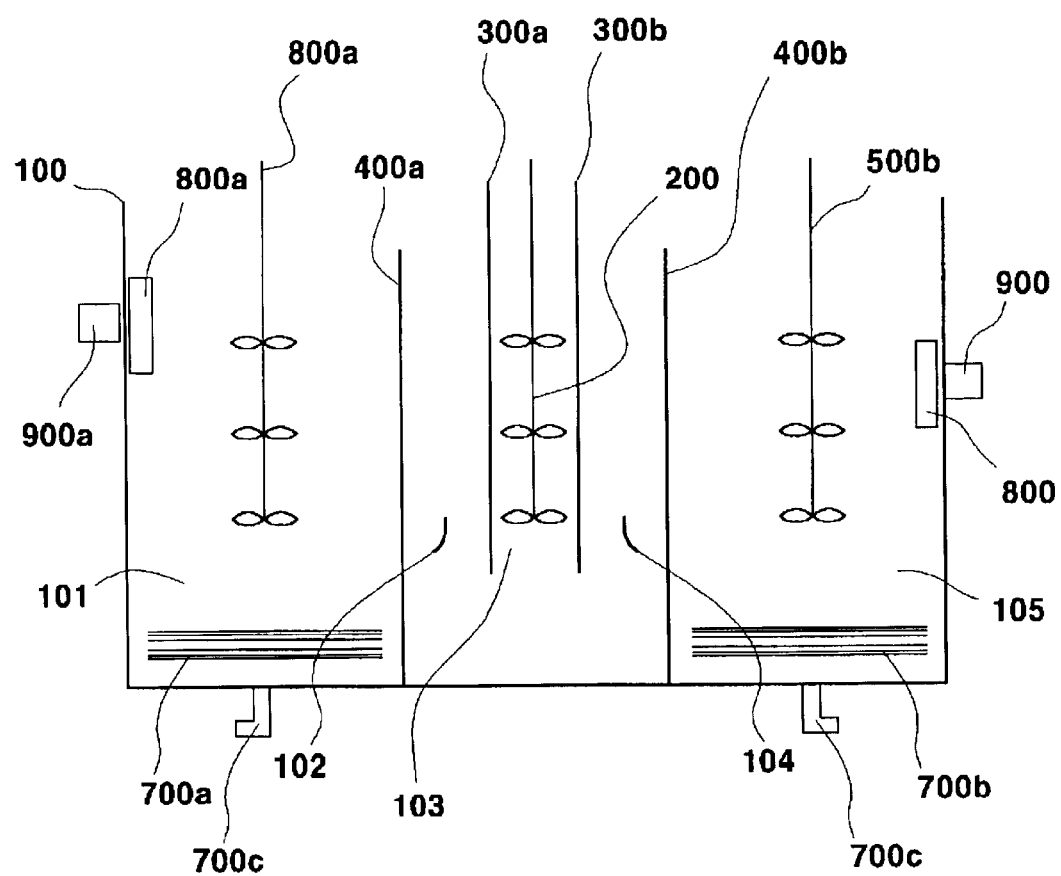
FIG. 4A is a cross-sectional view of the purifying apparatus according to a third embodiment of the present invention.
Figure 4B:
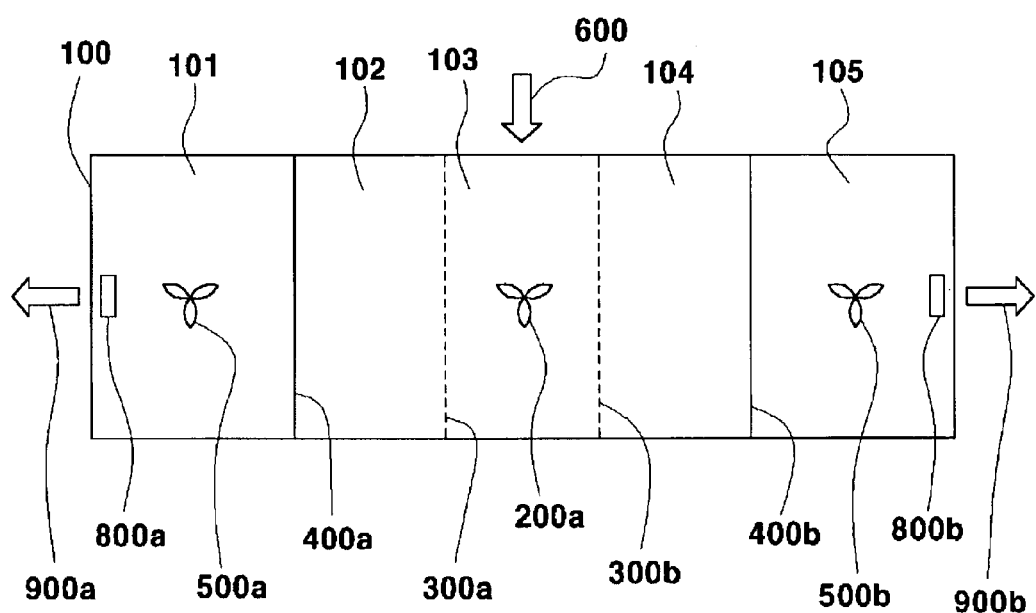
FIG. 4B is a plan view of FIG. 4A.

FIG. 4A is a sectional side view of a purifying apparatus using back overflowed sludge according to a third embodiment of the present invention, and FIG. 4B is a plan view of the purifying apparatus. The purifying apparatus according to the third embodiment of the invention is constructed in a manner that the working reaction tank and the main reaction tank of the purifying apparatus of FIG. 1 are symmetrically arranged with the anaerobic region of the working reaction tank in the center. Specifically, the purifying apparatus using back overflowed sludge according to the third embodiment of the invention includes a single water tank 100, a predetermined number of barriers 300a, 300b, 400a and 400b symmetrically set inside the water tank 100, an inflow port 600 through which waste water flows into the water tank, aerators 700a and 700b, stirrers 200, 500a and 500b for stirring the waste water contained in the water tank, a sludge outlet 700c for wasting sludge, purified water outlets 900a and 900b for discharging purified water, and decanters 800a and 800b for controlling discharge of purified water.

The water tank 100 is divided into the working reaction tank and the main reaction tank by the barriers as in the first embodiment of the invention. The working reaction tank and the main reaction tank are symmetrically arranged with one inflow port for accepting wastewater in the center. The working reaction tank includes an anaerobic region 103 defined by the barriers 300a and 300b, a first anaerobic/anoxic region 102 formed by the barriers 300a and 400a, and a second anaerobic/anoxic region 104 defined by the barriers 300b and 400b. The first and second anaerobic/anoxic regions 102 and 104 are symmetrically arranged with the anaerobic region 103 in the center. In addition, the main reaction tank is further divided into a first main reaction tank 101 formed by the barrier 400a and the water tank's wall and a second main reaction tank 105 formed by the barrier 400b and the water tank's wall. The first and second main reaction tanks are symmetrically arranged with the anaerobic region 103 in the center.

The operation of the purifying apparatus according to the third embodiment of the invention is identical to those of the purifying apparatuses according to the first and second embodiments of the invention. That is, the anaerobic region 103 allows microorganisms to release phosphorus stored in their cells while maintaining high MLSS concentration contained therein under anaerobic condition. Sludge back overflowed into the anaerobic/anoxic region (102, 104) from main reaction tanks 101 and 105 is settled and concentrated by force of gravity therein so that high MLSS concentration can be maintained in the anaerobic/anoxic regions. The sludge denitrifies nitrate flowing into the anaerobic/anoxic regions 102 and 104 from the main reaction tanks and release phosphorus during the anaerobic condition. In the main reaction tanks 101 and 105, nitrogen and phosphorus are removed through aerobic and anoxic processes, the sludge is settled during settling process, and effluent is drawn during decanting process. Here, the barriers 400a and 400b are lower than the barriers 300a and 300b and are so high as to be sunk in the influent waste water when a water level of the influent waste water rises such that the sludge can be flowed backward into the anaerobic/anoxic regions 102 and 104 from the main reaction tanks 101 and 105 by turbulent produced by aerator and stirrer for aerobic or anoxic process.

The operation of the purifying apparatus using back overflowed sludge according to the third embodiment of the invention is the same as those of the purifying apparatuses of the first and second embodiments shown in FIGS. 2A to 2E. The operation of the apparatus of the third embodiment is explained below with reference to FIGS. 5A to 5E illustrating the purifying method of the apparatus.

Figure 5A:
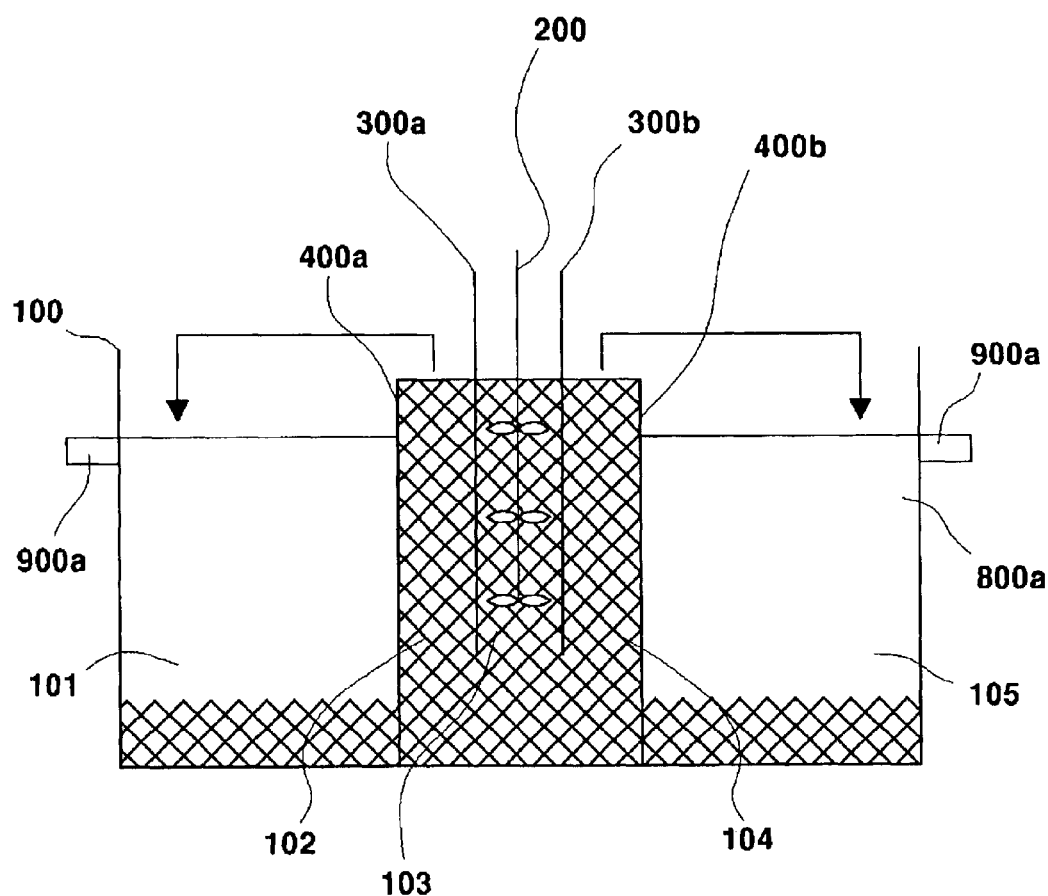
FIGS. 5A to 5E illustrate a purifying method in the wastewater purifying apparatus using back overflowed sludge according to the third embodiment of the present invention.

First of all, when influent flows into the anaerobic region 103 through the inflow port 600, it fills the anaerobic region 103 and the first and second anaerobic/anoxic regions 102 ad 104, and then flows over the barriers 400a and 400b into the first and second main reaction tanks 101 and 105. In doing so, sludge release phosphorus using organic compound contained in the influent water in the anaerobic region 103. Simultaneously, when the stirrer 200 operates, as shown in FIG. 5A, the influent and sludge contained therein, filled in the anaerobic region 103 and the first and second anaerobic/anoxic regions 102 and 104, flow over the barriers 400a and 400b from the anaerobic region 103 into the first and second main reaction tanks 101 and 105 via the anaerobic/anoxic region 102 and 104.

Figure 5B:
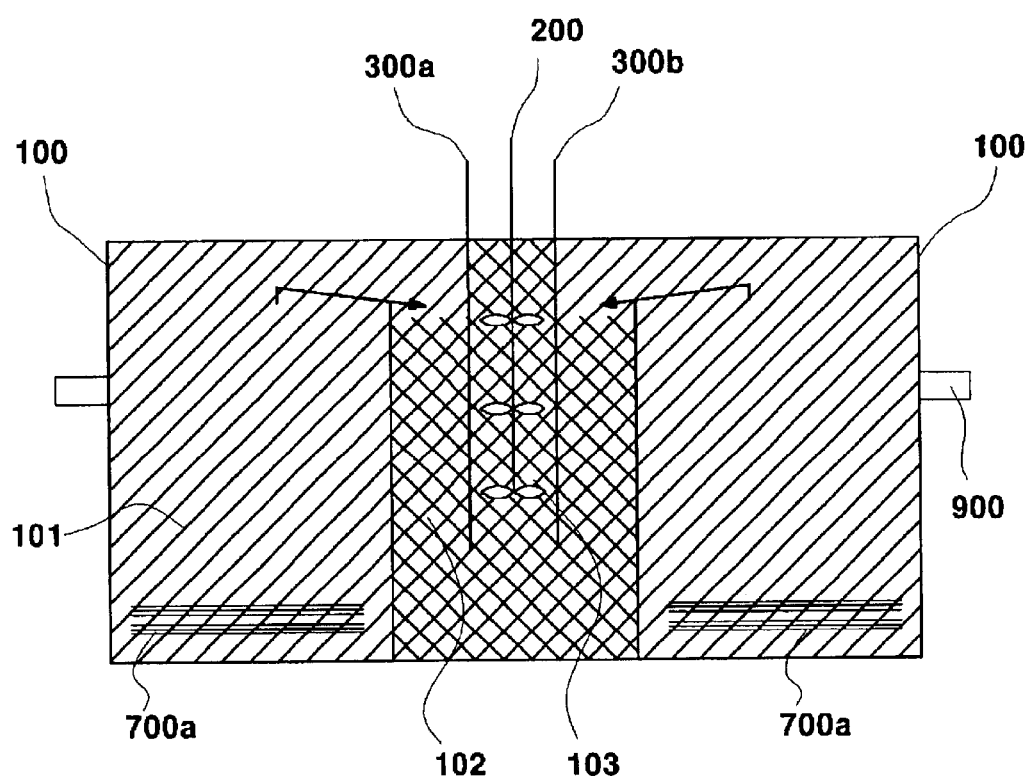

Subsequently, as shown in FIG. 5B, nitrogen and phosphorus are removed in the first and second main reaction tanks 101 and 105, and the sludge flows backward over the barriers 400a and 400b from the first and second main reaction tanks 101 and 105 into the first and second anaerobic/anoxic regions 102 and 104 according to the operation of the aerators 700a and 700b and stirrer 800a and 800b. Then, when aerator and stirrer stop, the sludge is settled and is concentrated by force of gravity.

Figure 5C:
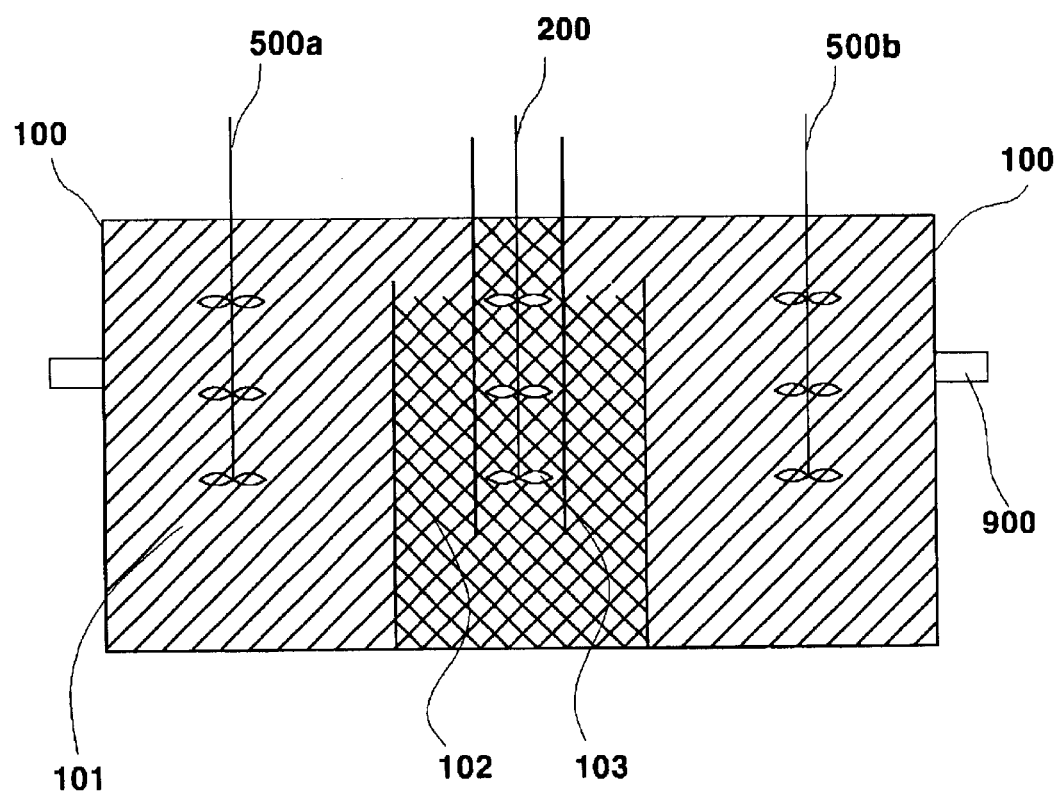
Figure 5D:
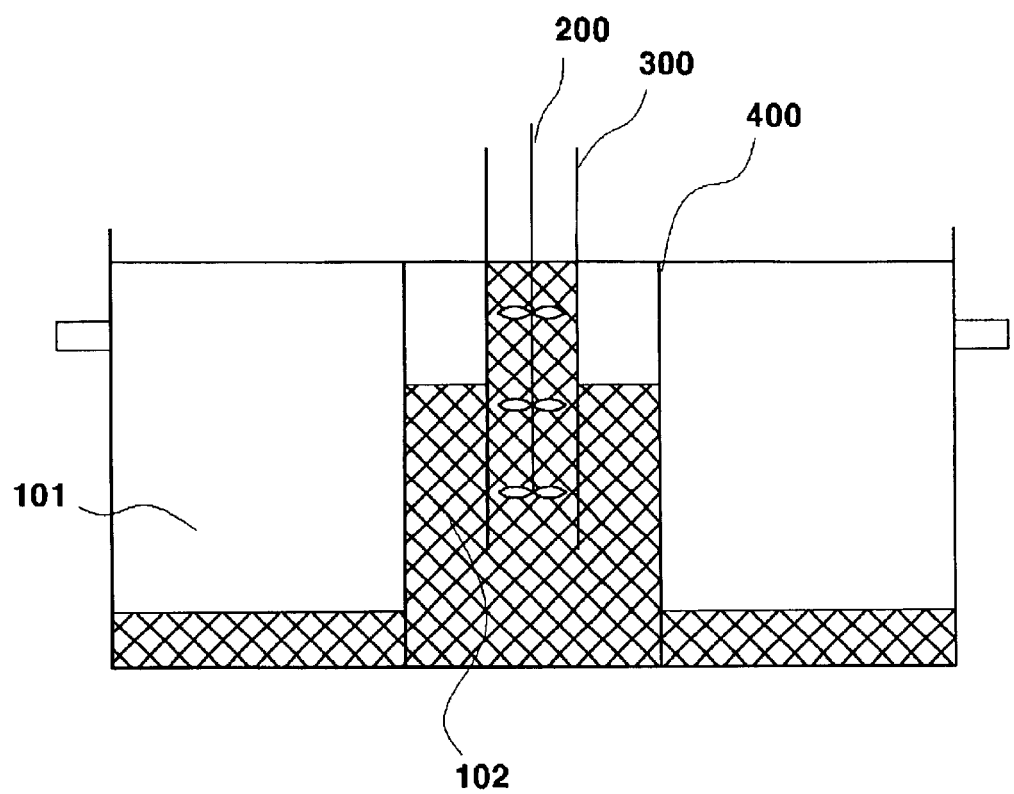
Figure 5E:
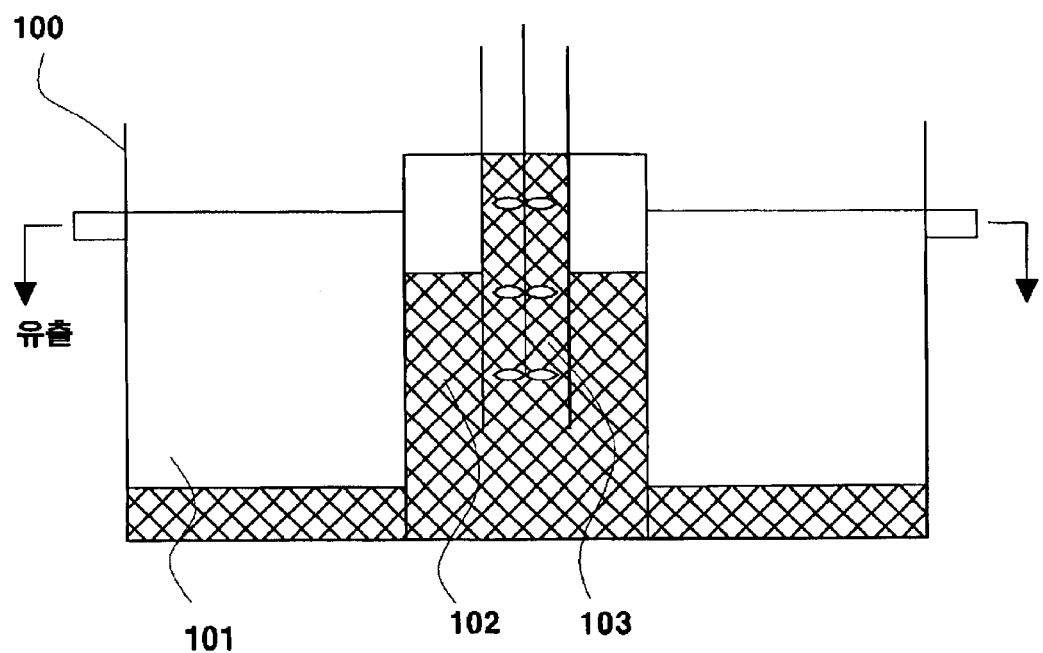

Referring to FIG. 5C, when the aerators 700a and 700b stop their operations and the first and second main reaction tanks 101 and 105 become the anoxic condition, nitrogen is removed according to denitrification in the main reaction tanks. Then, as shown in FIGS. 5D and 5E, settling occurs in each reaction tank to separate purified water and sludge.

The aforementioned purifying process (5A→5B →5C →5D →5E) according to the present invention is repeated such that nitrogen and phosphorous removal rate of the present invention is better than typical SBR.

An operation method for the present invention can be variously changed due to source of wastewater, temperature, weather, and so on, which aerator and stirrer can be operated intermittently or continuously, result in modifying aerobic or anoxic process.

To maintain a proper amount of sludge in the process and remove phosphorous, an excess of sludge in the present invention is wasted out.

Meanwhile, according to operating method of stirrer set in anaerobic region, MLSS concentration in anaerobic region become uniform and the quantity of transferring sludge is increased.

Figure 6:
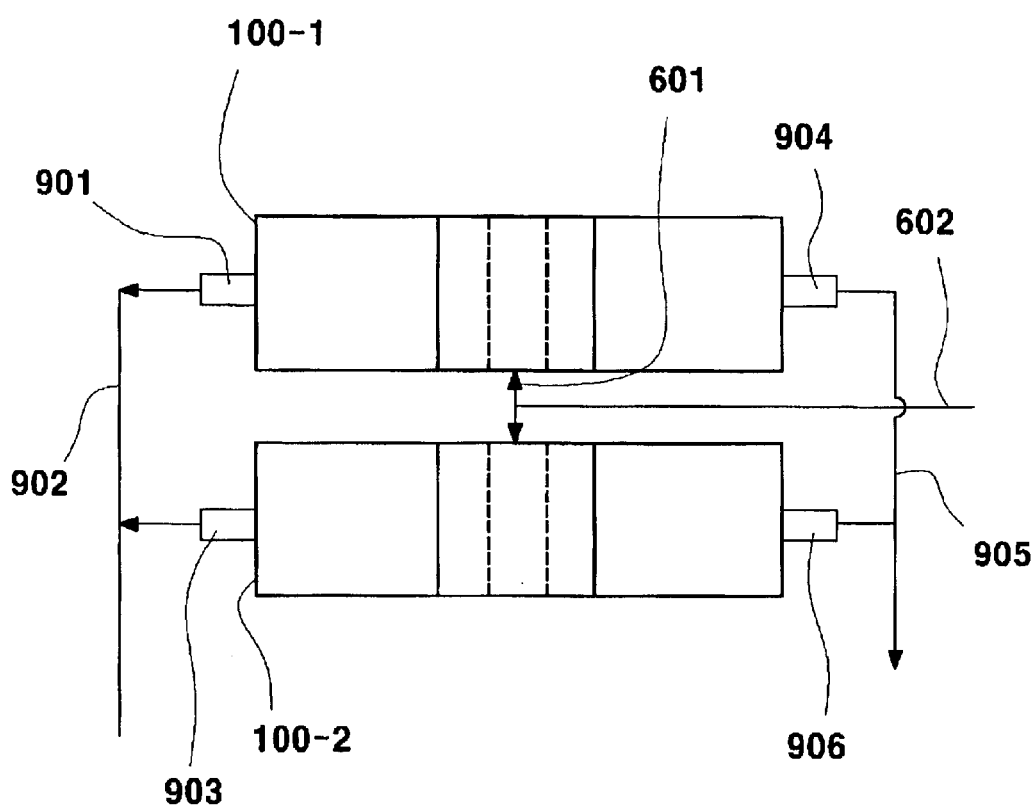
FIG. 6 is a plan view of a purifying apparatus using overflowed sludge according to a fourth embodiment of the present invention.

FIG. 6 is a plan view of a purifying apparatus using back overflowed sludge according to a fourth embodiment of the present invention. The purifying apparatus of the fourth embodiment of the invention has the same water tanks as that of the purifying apparatus of the third embodiment, which are arranged in parallel with each other. Specifically, the purifying apparatus according to the fourth embodiment is constructed in such a manner that the first and second water tanks 100-1 and 100-2 are arranged in parallel with each other, an inflow port 601 connected with an inflow pipe 602 through which waste water flow is coupled to the anaerobic region of each of the water tanks 100-1 and 100-2, and effluent ports 901, 903, 904 and 906 for drawing purified water from the water tanks 100-1 and 100-2 are connected with discharging pipes 902 and 905.

The purifying apparatus according to the fourth embodiment of the invention, constructed as above, is operated in the same way on which the apparatus of the third embodiment works. That is, while the anaerobic region, anaerobic/anoxic region and main reaction tank of the first water tank 100-1 accept waste water through an inflow port, and purify it, the main reaction tank of the second water tank 100-2 purity wastewater contained therein without receiving influent and draw purified wastewater after settling process. On the contrary, while the anaerobic/anoxic region and main reaction tank of the first water tank 100-1 purify wastewater contained therein without receiving influent and draw purified wastewater after process, the anaerobic region, anaerobic/anoxic region and main reaction tank of the second water tank 100-2 accept waste water and purify it.

Upon the operation method of the stirrer set in the anaerobic region, sludge can be transferred in two-types. The one type is uniformly transferring sludge from the anaerobic region to the main reaction tank while filling the main reaction tank to the provide level with water. The other type is increasing amount of sludge returned from the main reaction tank to anaerobic region by transferring sludge settled and concentrated in anaerobic/anoxic region rapidly to anaerobic region for aerobic or anoxic process in the main reaction tank.

In the above-described purifying apparatuses according to the embodiments of the present invention, waste water flowing into the water tank pass through the anaerobic process, aerobic process and anoxic process to efficiently remove nitrogen and phosphorus in influent. The sludge in the anaerobic region and the anaerobic/anoxic region is the one that is returned by turbulent flow during the previous aerobic or anoxic process in the main reaction tank to transfer thereto. Accordingly, the sludge concentration in the anaerobic/anoxic region is maintained high because the sludge back flowed over the second barrier into the anaerobic/anoxic region from the main reaction tank being in the aerobic process. The sludge in anaerobic region and anaerobic/anoxic region will flow into the main reaction tank on the following process with influent.

In the anaerobic/anoxic region, partial denitrification occurs in its upper part being in the anoxic state and the anaerobic state is maintained in its lower part while the main reaction tank is in the aerobic condition. Thus nitrate flowing from the main reaction tank is denitrified in upper part of anaerobic/anoxic region.

Therefore, anaerobic region can maintain absolute anaerobic condition in spite of inflowing nitrate from the main reaction tank. The upper part of anaerobic/anoxic maintain the anoxic condition while the main reaction tank perform the aerobic process, and there is anaerobic condition all over anaerobic/anoxic region before the following aerobic process, so that phosphorous is well released in anaerobic region.

The sludge flows backward from the main reaction tank into the anaerobic/anoxic region while the main reaction tank carries out the aerobic process and anoxic process. When the stirrer operates, especially, larger amount of sludge return into the anaerobic/anoxic region during the aerobic period during which stirring is performed with bubbles rising rather than in the anoxic period. Accordingly, the sludge according to the turbulent flow formed by the aerator and the stirrer of the main reaction tank rise with the bubbles to the surface and is settled on the upper part of anaerobic/anoxic region by force of gravity so that sludge flow backward over second barrier into the anaerobic/anoxic region being in the steady flow state, and the sludge returned to anaerobic/anoxic is settled and concentrated by force of gravity.

All the aforementioned processes are performed in a natural flow from the inflow of wastewater to the outflow thereof. The operation modes of the anaerobic region, anaerobic/anoxic region and main reaction tank can be configured in various manners according to the source of wastewater or a purpose of processing it.

Since the sludge is settled in the anaerobic/anoxic region to prevent nitrate from inflowing so that the anaerobic region and the main reaction tank (aerobic condition) are completely separated from each other, the anaerobic process is performed in the anaerobic region and the aerobic process is carried out in the main reaction tank in one water tank.

Therefore, according to the purifying apparatus of the present invention, the barriers are set inside the water tank such that the inflow part (anaerobic region) induces microorganism conditions to allow microorganisms to efficiently release phosphorus. Nitrate flowing from the main reaction tank is denitrified in the middle part of water tank (anaerobic/anoxic region) connected with the main reaction tank to sufficiently release phosphorus in the anaerobic region. In addition, sludge suspended by bubbles and turbulent flow during the aeration period of the main reaction tank 30 is settled and concentrated so as to maintain high sludge content in the anaerobic region and the anaerobic/anoxic region 20, thereby effectively removing nitrogen and phosphorus contained in wastewater.

Furthermore, the embodiments of the purifying apparatus using back overflowed sludge according to the present invention can be continuously or intermittently operated to improve removal rate.

The embodiments of the purifying apparatus according to the present invention do not require additional pump and pipe for sludge return because they make sludge inversely flow from the main reaction tank to the anaerobic/anoxic region through the barrier set inside the water tank using fluid energy generated during the purifying process without installing a separate transfer device for transferring the sludge from the main reaction tank to the anaerobic/anoxic region and the anaerobic region in order to maintain high sludge content and remove nitrogen and phosphorus.

Moreover, the embodiments of the purifying apparatus according to the present invention set the barrier for dividing the water tank into the steady-flow region and the turbulent-flow region and allow sludge to flow backward over the barrier from the turbulent-flow region to the steady-flow region to propagate microorganisms for nitrogen and phosphorous removal, thereby efficiently removing nitrogen and phosphorus. In addition, the present invention can reduce installation cost, area and maintenance cost of the purifying apparatus because it does not require an extra sludge concentrator or a sludge returning device in order to maintain a proper MLSS for process.

Furthermore, the present invention provides simple purifying apparatus and method capable of purifying wastewater continuously or intermittently. Thus, the purifying apparatus of the invention can be widely applied and is strong on variation of flowrate.

More, if barriers are inserted in forepart of typical SBR, it can obtain some effect of the present invention. Consequently, the present invention's principle that sludge in turbulent is flowed backward into steady flow region by mixer and aerator in reactor can be easily applied to various wastewater treatment reactor.

The forgoing embodiments are merely exemplary and are not to be construed as limiting the present invention. The present invention can be readily applied to other types of apparatuses. The description of the present invention using sludge back flowed over barrier is intended to be illustrative, and not to limit the scope of the claims. Many alternatives, modifications, and variations will be apparent to those skilled in the art.

What is claimed is:

1. A wastewater purifying apparatus using back overflowed sludge, comprising:
    a water tank having an inflow port for accepting wastewater and an outlet for drawing purified water; and
    a first barrier for dividing the water tank into a steady-flow region and a turbulent-flow region according to flow type, the first barrier sunk in the wastewater when it is filled in the water tank to a predetermined water level to allow sludge of the turbulent-flow region to inversely flow into the steady-flow region.

2. The purifying apparatus as claimed in claim 1, wherein the steady-flow region includes a first stirrer, and the wastewater flowing through the inflow port into the steady-flow region is subjected to anaerobic/anoxic treatment in the steady-flow region.

3. The purifying apparatus as claimed in claim 2, wherein the turbulent-flow region includes a second stirrer, and the wastewater flowing from the steady-flow region into the turbulent-flow region is subjected to aerobic/anoxic treatment in the turbulent-flow region.

4. The purifying apparatus as claimed in claim 1, wherein a second water tank having the same structure as that of the water tank is installed in parallel with the water tank to continuously purify wastewater.

5. The purifying apparatus as claimed in claim 1, further comprising a second barrier for dividing the steady-flow region into an anaerobic region and a buffering region (anaerobic/anoxic region), the anaerobic region accepting the wastewater incoming through the inflow port, the buffering region (anaerobic/anoxic region) accepting the sludge back flowed the first barrier from the turbulent-flow region to purify influent wastewater.

6. The purifying apparatus as claimed in claim 5, wherein the height of the first barrier is lower than those of the water tank and the second barrier.

7. The purifying apparatus as claimed in claim 5, wherein the turbulent-flow region includes an aerator for injecting air into the wastewater and transferring the sludge to the buffering region.

8. The purifying apparatus as claimed in claim 7, wherein the anaerobic region and the turbulent-flow region include a plurality of stirrers for stirring the wastewater and sludge uniformly.

9. The purifying apparatus as claimed in claim 8, wherein the wastewater is subjected to anaerobic treatment and anoxic treatment in the buffering region (anaerobic/anoxic region).

10. The purifying apparatus as claimed in claim 8, wherein the wastewater is subjected to aerobic treatment and anoxic treatment.

11. The purifying apparatus as claimed in claim 5, wherein a second water tank having the same structure as that of the water tank is installed in parallel with the water tank to continuously purify wastewater.

12. The purifying apparatus as claimed in claim 5, wherein the water tank further comprises third and fourth barriers such that the buffering region and the turbulent-flow region are symmetrically arranged with the anaerobic region in the center.

13. The purifying apparatus as claimed in claim 12, wherein a third water tank having the same structure as that of the water tank is installed in parallel with the water tank to continuously purify wastewater.

14. A wastewater purifying apparatus using back overflowed sludge, comprising:
    a water tank having an inflow port for accepting wastewater and a purified water outlet for discharging purified water;
    a first barrier for dividing the water tank into a working reaction tank and a main reaction tank according to nitrogen phosphorous removal mechanism, the working reaction tank including a steady-flow region accepting the wastewater through the inflow port, the main reaction tank forming a turbulent-flow region and discharging purified water through the purified water outlet, the first barrier submerged in the wastewater filled in the water tank; and
    a second barrier for dividing the working reaction tank into an anaerobic region and a buffering region, the anaerobic region accepting the wastewater, the buffering region (anaerobic/anoxic region) accepting sludge back flowed over the first barrier from the main reaction tank, the buffering region purifying the wastewater.

15. The purifying apparatus as claimed in claim 14, wherein the main reaction tank includes an aerator for injecting air into the wastewater and simultaneously transferring the sludge to the buffering region (anaerobic/anoxic region).

16. The purifying apparatus as claimed in claim 15, wherein the anaerobic region and the main reaction tank include a plurality of stirrers for uniformly stirring the wastewater contained therein.

17. The purifying apparatus as claimed in claim 14, wherein the anaerobic region and the main reaction tank include a plurality of stirrers for uniformly stirring the wastewater contained therein.

18. The purifying apparatus as claimed in claim 14, wherein the buffering region (anaerobic/anoxic region) of the working reaction tank performs an anaerobic process and an anoxic process, and the main reaction tank carries out an aerobic process and an anoxic process.

19. The purifying apparatus as claimed in claim 14, wherein a second water tank having the same structure as that of the water tank is installed in parallel with the water tank to continuously purify waste water.

20. The purifying apparatus as claimed in claim 14, wherein the water tank further includes third and fourth barriers such that the buffering region and the main reaction tank are symmetrically arranged with the anaerobic region in the center.

21. The purifying apparatus as claimed in claim 20, wherein a third water tank having the same structure as that of the water tank is installed in parallel with the water tank to continuously purify wastewater.

22. A wastewater purifying method using back overflowed sludge, comprising:

- a microorganism selection process of adsorbing organisms by maintaining a high F/M ratio using organisms contained in influent wastewater;
- an anaerobic process of forming an anaerobic condition to release phosphorus;
- a sludge transferring process of allowing sludge to flow over a barrier from an anaerobic region into a main reaction tank via an anaerobic/anoxic region;
- an aerobic process of oxidizing organic nitrogen and ammonia into nitrogen nitrate using an aerator of the main reaction tank and excessively taking in phosphorus;
- an anoxic process of denitrifying the nitrate generated during the aerobic process to remove the nitrogen;
- a sludge transferring process of allowing sludge rising during the aerobic process to re-flow over the barrier into the anaerobic/anoxic region (the buffer region);
- a first settling process of settling the sludge in the anaerobic/anoxic region;
- a concentration process of concentrating the deposited sludge by force of gravity;
- a transferring process of transferring the concentrated sludge into the anaerobic region;
- a second settling process of depositing mixed sludge in the main reaction tank; and
- a drawing process of discharging purified water separated from the sludge.

* * * * *